Sept. 16, 1958     R. L. SAMSON     2,852,728
REMOTE CONTROL SYSTEM FOR AUTOMATIC
POSITIONING OF SWITCHES
Filed Aug. 28, 1956     3 Sheets-Sheet 1
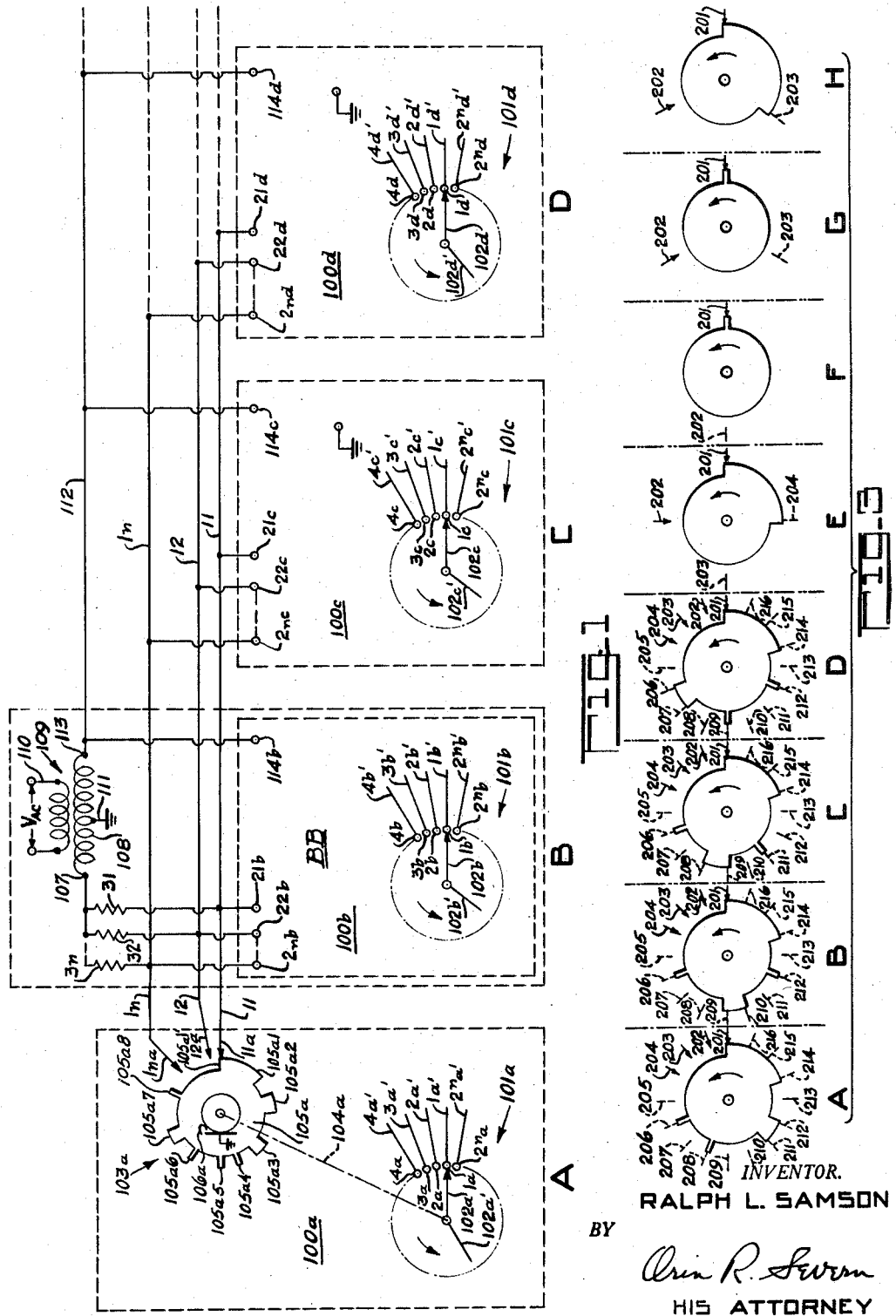
INVENTOR.
RALPH L. SAMSON
BY
HIS ATTORNEY Sept. 16, 1958  R. L. SAMSON  2,852,728
REMOTE CONTROL SYSTEM FOR AUTOMATIC
POSITIONING OF SWITCHES
Filed Aug. 28, 1956  3 Sheets-Sheet 2
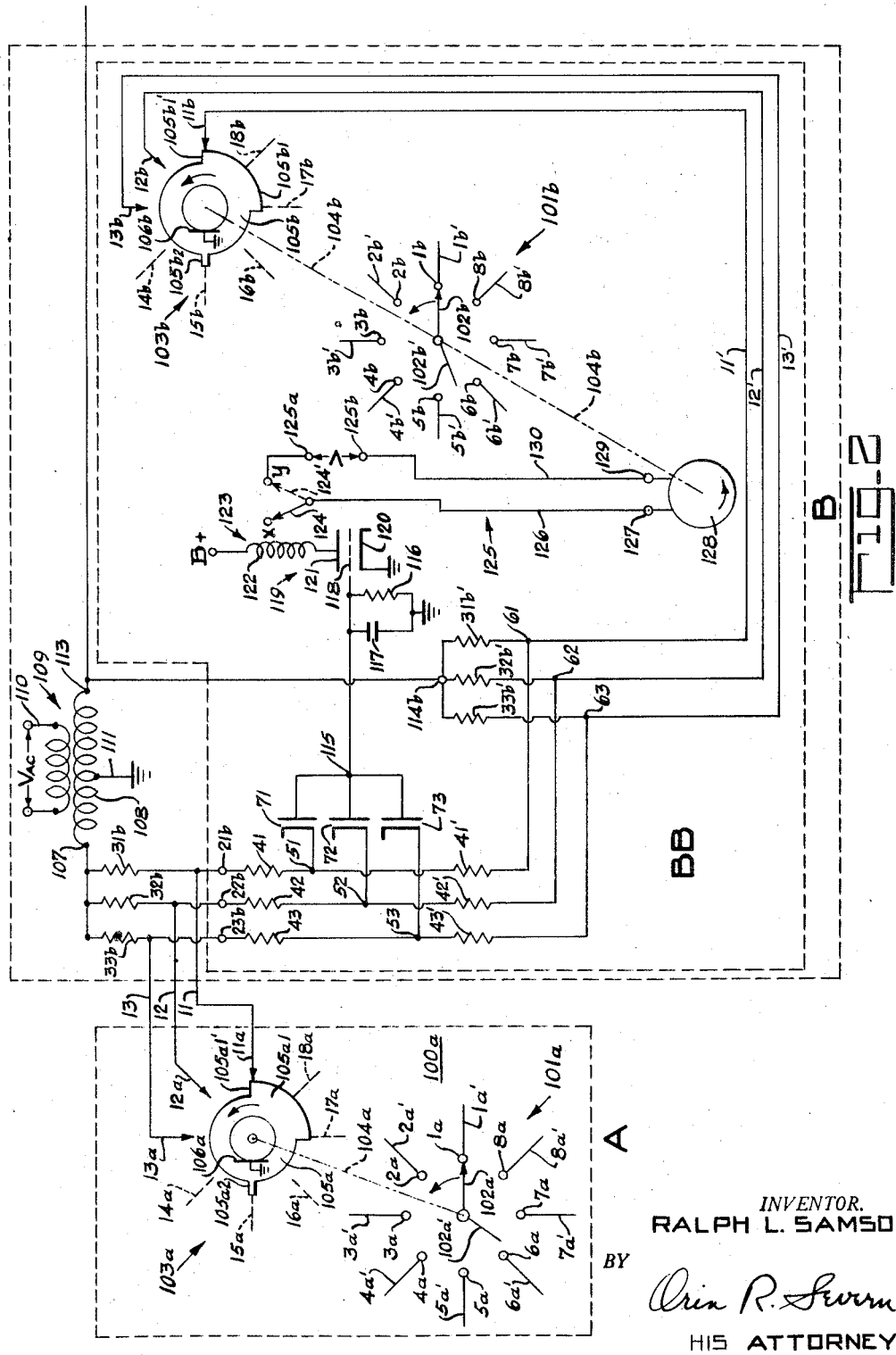
INVENTOR.
RALPH L. SAMSON
BY
Orin R. Severn
HIS ATTORNEY

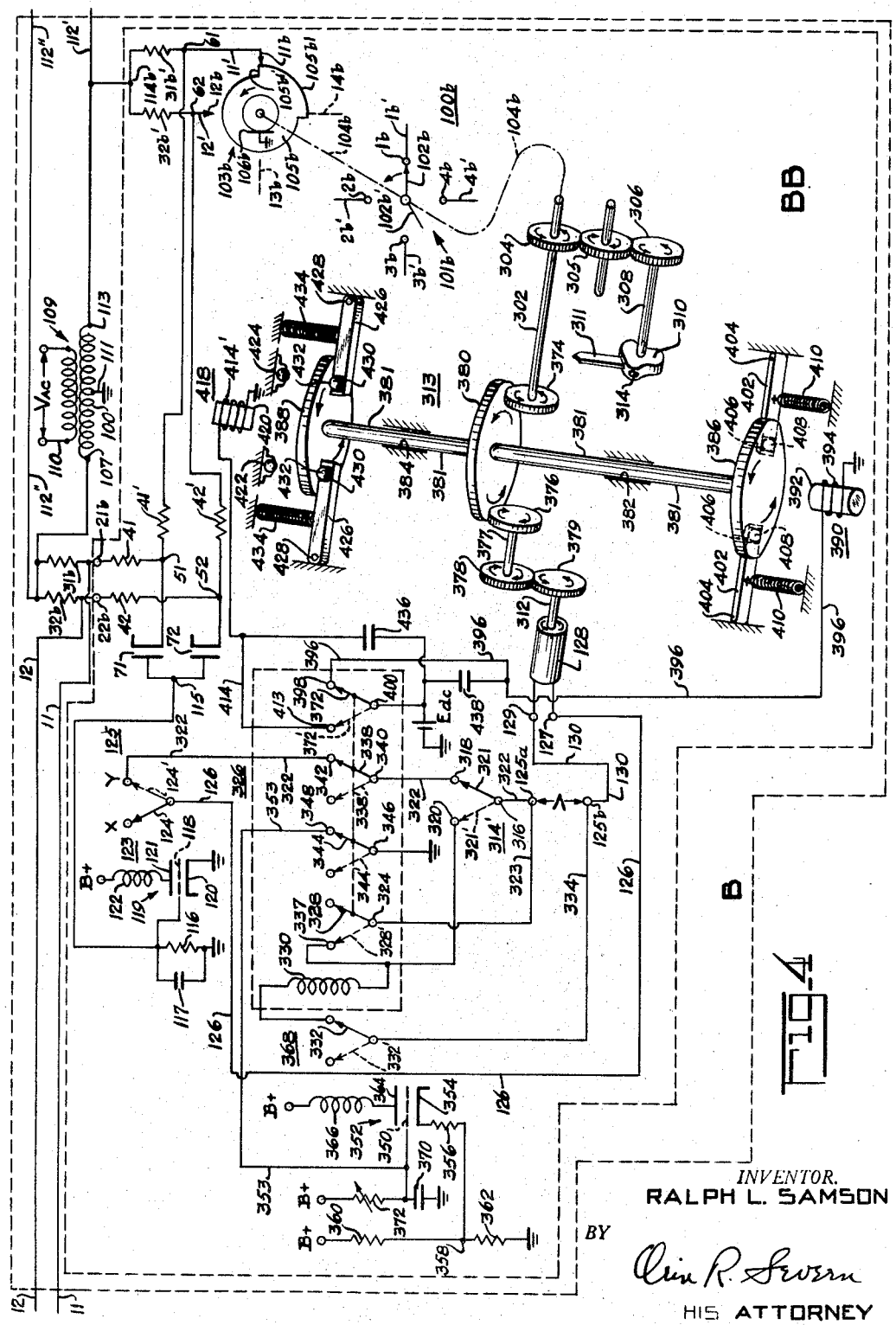

United States Patent Office 2,852,728
Patented Sept. 16, 1958

2,852,728

REMOTE CONTROL SYSTEM FOR AUTOMATIC POSITIONING OF SWITCHES

Ralph L. Samson, Wyckoff, N. J., assignor to Curtiss-Wright Corporation, a corporation of Delaware Application August 28, 1956, Serial No. 606,696

27 Claims. (Cl. 318—467)

This invention relates to switching circuits and more particularly to a control system for automatic positioning of a number of switches remotely located from one another.

A system of the afore-described character is known in the art and comprises two auxiliary switching circuits for each of the controlled switches positioned in accordance therewith. A number of control wires interconnect the auxiliary switching circuits which together with the interconnecting wires form part of an energization circuit for a relay. The arrangement is such that an energization current for said relay flows only when the switches are in non-corresponding positions. Actuation of the relay closes an energization circuit for a rotary solenoid or other suitable sequential positioning means, which in discrete steps positions one of the controlled switches through its positions to eventually reestablish correspondence of positions of the two switches.

The necessity of two auxiliary circuits per controlled switch and the necessity of large diameter wire to carry the heavy relay current results in rather bulky equipment, which in certain applications, for example in aircraft or aircraft trainers, is objectionable because of the small available space. In other applications use of the device described has been disadvantageous when it became necessary to integrate additional controlled switches in an already existing system. Upon such occasion it had been necessary to interrupt service between the already operating stations containing position-controlled switches prior to installation of an additional station, or at least it was necessary for the installer of the new station to be informed of the position of the switches in already operating stations. Bilateral operation, to be more fully defined hereinafter, has also proved difficult with the system described.

It is an object of the invention to provide a control system including a minimum of auxiliary control switching circuits, utilized at their highest efficiency, requiring a minimum of space and a low current drain thus permitting the use of small diameter wires.

Another object of the invention is to provide a control system of the character described which admits of ready integration of new controlled switches without disruption of service of the previously installed switches, any newly installed switches aligning themselves automatically therewith.

Still another object of the invention is to provide a control system of the character described suitable for complete bilateral operation.

These and other objects will become more readily apparent from the following description when considered together with the accompanying drawings, in which:

Fig. 1 is a block diagram of the control system,

Fig. 2 is a diagrammatic view of the control system including in greater detail the control circuitry within block BB of Fig. 1, Fig. 3 is a diagrammatic view of a number of auxiliary switching circuit patterns, the configurations of which depend upon the number of positions of the controlled switches, and Fig. 4 is a partly diagrammatic and partly perspective view of apparatus for bilateral control.

In the drawings like characters generally identify like parts.

According to the invention a control circuit is provided having three terminals for energization thereof by a pair of alternating voltages applied from each end terminal to the center terminal. A number of networks are connected across the end terminals, which number depends upon the number of positions of the controlled switches. Each network is provided with three taps or junction points, the innermost junction point being arranged to be normally at the potential of the center input terminal. Each of the junction points intermediate of one end terminal and an innermost junction point is respectively connected by a control lead to the terminals of an auxiliary switching circuit which is operable according to the operation of a controlled switch. Each of the remaining outer junction points is connected by a control lead to a similar auxiliary switching circuit of another controlled switch. The common terminals of the auxiliary switching circuits are connected to the center input terminal. As a controlled switch and therefore its associated auxiliary switching circuit traverses the possible switch positions, distinct of the associated junction points are short-circuited to the center input terminals, whereas the remaining junction points are not so short-circuited. The arrangement is such that when the switches are in corresponding positions the outer junction points of each circuit are either both short-circuited or both not short-circuited to the center input terminal. Consequently in such normal condition the innermost junction points remain at the potential of the center input terminal. When the switches are in non-corresponding positions at least one outer junction point is not in the same circuit condition as the other outer junction point of the same network. Consequently, the innermost junction point of such network is no longer at the potential of the center input terminal, so that a rectified current may flow through a diode connected to the innermost junction point of such one circuit. Each network is provided with a diode connected to its innermost junction point and the rectified current of at least one such diode is sufficient to actuate a means for sequentially positioning one or more of the switches and their associated auxiliary switching circuits to ultimately reestablish correspondence of switch positions.

The invention will be more fully set forth in the subsequent description, in which the controlled switches are described by way of example as intended for selector tuning of similar radio receivers of the type used in aircraft or aircraft trainers for example, but it is to be understood that the invention is applicable to switchable apparatus in general, whether mechanically, electromechanically, or electronically switchable. Accordingly the terms "switch" and "position" are intended to apply to mechanical, electromechanical, or electronic switching means.

Referring to Fig. 1, reference character A identifies a "master station" and reference characters B, C, D, etc., identify a number of "slave stations." The stations may contain, for example, similar selector switch tuned radio receivers. Tuning of the master station is accomplished by external manual or external automatic rotation of the selector switch 100a, which switch may be rotatable in either direction. Switch 100a comprises a main switching wafer or circuit or section 101a which has a number of discrete positions corresponding to the completion of a circuit between the rotatable common or permanent or collector contact 102a and one of the stationary angularly equispaced selector contacts 1a, 2a, 3a etc. (The sequential numbering 1, 2, 3 etc., thus represents a selector contact as well as a switch position for an assumed counter-clockwise direction of rotation beginning with the condition of collector contact 102 in contact with the selector contact 1a as indicated.) Suitable detents (not shown) are provided to preclude the possibility of the collector contact 102 coming to rest in a position intermediate of selector contacts. The collector contact 102 is connected to an associated lead 102a which runs to an appropriate circuit, whereas each of the selector contacts 1a, 2a, 3a, etc. is respectively connected to associated outgoing leads 1a', 2a', 3a', etc., in turn leading to appropriate circuits. The slave stations contain corresponding switches 100b, 100c, 100d, etc. and respectively associated main wafers 101b, 101c, 101d, etc., each switch having the same number of switch positions as the switch 100a as signified by the correspondence of the reference numerals for the switch components and associated leads. It is desired that whenever the tuning frequency of the master station is changed by switching of the collector contact 102a the slave stations be tuned to the master station frequency by internal automatic setting of the collector contacts 102b, 102c, 102d, etc. to their respective selector contacts corresponding to the selector contact to which the collector 102a has been set.

To this end an auxiliary control switch wafer 103a is ganged to the main switch 101a as indicated by the connections 104a. As a matter of convenience in illustration separate wafers are indicated for the main wafer 101a and the auxiliary wafer 103a, but it is to be understood that the two sets of stator contacts could be disposed on the two faces of a single stator disc or even on the same face. However, only one auxiliary control switching circuit is required and herein lies one of the advantages of the present invention. Prior art devices had required two auxiliary control switching circuits. The auxiliary control wafer 103a has as many switch positions as the main wafer 101a. By way of example and for reasons which will be apparent from the description hereinafter, the number of positions of the main and auxiliary wafers is assumed to be an exact power of two and for this reason the last position of the main switch 100a is indicated by the reference character $2^n a$. The auxiliary wafer 103a comprises a rotatable common or permanent or collector contact 105a which is permanently grounded as diagrammatically indicated by the slip ring and brush connection 106a, the brush portion of which is tied to ground. The collector contact 105a is provided with a number of radially projecting contact portions 105a1, 105a2, 105a3, 105a4, 105a5, 105a6, 105a7, and 105a8, which in their rotary travel come in contact with selector contacts. Corresponding to the selector terminals 1, 2, 3 . . . n of the main wafer 101a there are provided a series of stationary angularly equispaced selector contacts sequentially designated as 11a, 12a, . . . 1na, to which there are respectively connected a series of outgoing control leads 11, 12, . . . 1n. Whenever a contact of the series 11a, 12a, . . . 1na connects to one of the projecting contact portions such contact is grounded.

As shown in Fig. 1 only the contact 11a is connected to a projecting portion (105a1) and therefore is the only grounded selector contact. The leading edge 105a1' of the projecting portion 105a1 is slightly ahead of the contact 11a (considered in the assumed counter-clockwise direction of rotation). Such position of the leading edge 105a1' slightly in advance of the contact 11a is intended to signify that the main and auxiliary wafers 101a and 103a are in switch position 1; similarly, the fact that the leading edge 105a1' advances to a position slightly ahead of the contacts 2a, 3a, etc., is intended to indicate respectively switch positions 2, 3, etc., in addition to indication of a grounded circuit condition.

The leads 11, 12, . . . 1n are connected respectively to the terminals 21b, 22b, . . . 2nb in the slave station B; to the corresponding terminals 21c, 22c, . . . 2nc in slave station C; to the corresponding terminals 21d, 22d, . . . 2nd in the slave station D, etc. Additionally in the slave station B the leads 11, 12, . . . 1n are connected respectively to the ends of similar resistors, 31, 32, . . . 3n, whose other ends are connected together and are also connected to an end 107 of a secondary 108 of a transformer 109, whose primary 110 is energized by the alternating voltage $V_{ac}$. The center tap 111 of the secondary 108 is grounded, whereas a line 112 is connected to the other end 113 of the secondary 108. A series of terminals 114b, 114c, 114d, etc., respectively within the slave stations B, C, D, etc., are connected to the line 112 and therefore to the end 113 of the secondary 108. The slave stations C, D, etc., also contain grounded circuit points connected to a ground wire (not shown) interconnecting all the stations.

The remainder of the control circuitry for the slave station B is contained within the block BB and is illustrated in greater detail in Fig. 2. The remaining slave stations contain circuitry functionally identical to the circuitry within the block BB and for this reason no further illustration is required and therefore not presented.

For Fig. 2 it is assumed that the number $n$ is 3, i. e. that the switch 100a has eight positions; correspondingly the auxiliary wafer 103a is provided with three selector contacts 11a, 12a and 13a.

The main and auxiliary wafers 101a and 103a are in the switch position 1 as indicated by the connection of collector contact 102a to the selector contact 1a and by reason of the leading edge 105a1' being slightly ahead of the selector contact 11a. Positioning of said leading edge 105a1' slightly ahead of contacts 12a or 13a would signify that the switches 101a and 103a are in switch position 2 or 3 respectively, in addition to indication of a grounded circuit condition. Positioning of the leading edge 105a1' slightly ahead of the broken lines 14a, 15a, 16a, 17a or 18a on the other hand would merely signify that the main and auxiliary wafer are respectively in the fourth, fifth, sixth, seventh or eighth positions. In Fig. 2 the collector contact 105a has merely two radially projecting contact portions 105a1 and 105a2, the span and spacing of which will be explained hereinafter.

From each of the terminals 21b, 22b, and 23b (and in the case of $n$ other than three from each of the contacts up to and including 2nb) there extends a circuit to the terminal 114b, all such circuits being similar. In particular the circuit extending from the terminal 21b includes a resistor 41 one of whose ends is connected to the terminal 21b and whose other end is connected to the junction point 51. A resistor 41', substantially of the same value as resistor 41, is connected between the junction points 51 and 61, and a resistor 31b', substantially of the same value as resistor 31b, is connected between the junction 61 and the terminal 114b. The equal resistors 31b and 31b' may be of relatively low value, say of the order of thousands of ohms, whereas the equal resistors 41 and 41' may be of the order of 100,000 ohms or higher. The resistors 31b and 31b' and the corresponding similar resistors 32b and 32b', 33b and 33b' serve to preclude short-circuiting of the ends 107 or 113 of the secondary 108 in the event that the leads 11, 12, 13 or the corresponding leads 11', 12', or 13' are grounded and also to decouple the circuits from one another. In the case of more than one slave station the resistors 31b', 32b', 33b, etc., and corresponding resistors 31c', 32c', 33c, etc., additionally serve to decouple the respective slave station control circuits from the common end 113 of the secondary 108.

Analogously there is connected to the terminal 22b an end of a resistor 42 similar to resistor 41. The other end of resistor 42 is connected to the junction 52 from which a resistor 42′, substantially of the same value as resistor 42, extends, the other end of resistor 42′, being connected to the junction 62. A resistor 32b′, substantially of the same value as resistor 32b, is connected between the junction 62 and the terminal 114b. In similar fashion a resistor 43, similar to the resistors 41 and 42, is connected between the terminal 23b and the junction 53, and resistor 43′, substantially of the same value as resistor 43, is connected between the junction 53 and 63. A resistor 33b′, substantially of the same value as resistor 33b, is connected between the junction 63 and the terminal 114b. More generally for n other than three there will be n similar circuits connected between the terminals 21b, 22b, . . 2nb each containing a resistor similar to the resistor 41 connected between the terminal corresponding to 21b and the junction corresponding to 51, a resistor corresponding to 41′ and connected between the junctions corresponding to 51 and 61 substantially of the same value as resistor 41, and a resistor corresponding to 31b′, substantially of the same value as resistor 31b and connected between the junction corresponding to 61 and the terminal 114b. Ganged to the common shaft 104b of the main switch wafer 101b is an auxiliary wafer 103b which is of a construction functionally identical to the construction of the auxiliary wafer 103a. The auxiliary wafer 103b has appropriate parts identified in the same manner as have corresponding parts of the auxiliary wafer 103a with the letter b replacing the letter a of a corresponding part. A line 11′ extends from junction 61 to the contact 11b and similarly lines 12′ and 13′ connect junction 62 to contact 12b and junction 63 to contact 13b respectively. More generally, for n other than three, lines similiar to line 11′ will be connected from a junction corresponding to 61 to a contact corresponding to 11b. Thus it is seen that n balanced circuits are connected across the terminals 107 and 113.

As shown in Fig. 2 the contact 11a and its corresponding contact 11b are grounded whereas the contacts 12a and 13a and the corresponding contacts 12b and 13b are not grounded. The currents which flow over the line 11 through contact 11a to ground and over line 11′ through contact 11b to ground are relatively low, of the order of a few milliamperes, as contrasted to the heavy relay currents drawn by devices previously known over corresponding lines and contacts. The same low current value holds true for each of the remaining control lines were it grounded through its associated contact. Thus a small wire size is permissible for the lines 11, 12 and 13 (and for that matter, for the lines 11′, 12′, and 13′, as well). Moreover, as has been pointed out before, the construction of the auxiliary wafer 103a is of the highest simplicity, and as will be pointed out hereinafter, is of the greatest efficiency of utilization. These aforegoing advantages combine to permit construction of the master station switching circuitry in a very small space as compared to the circuitry included in devices constructed in accordance with prior art.

The junction 51 is at ground potential by reason of the grounding of the contacts 11a and 11b, whereas the junctions 52 and 53 are also at ground potential but for a different reason, namely because the circuits connected across the ends 107 and 113 of the secondary 108 are balanced with respect to the ground and junctions 52 and 53 respectively. A number of unidirectional devices or diodes 71, 72, 73 have their cathodes respectively connected to the junction points 51, 52, 53. The anodes of these diodes are connected together at junction 115 to which is also connected a rectifier load circuit comprising the parallel connected resistor 116 and capacitor 117 whose other ends are grounded. The diodes serve as rectifying means in the forward direction and also as means for decoupling their associated circuits from one another, in view of their blocking capability in the reverse direction. Also connected to the junction 115 is the grid 118 of a triode 119 whose cathode 120 is grounded and whose anode 121 is connected through the coil 122 of a relay 123 to the positive terminal of a direct voltage source B+, the negative terminal thereof being grounded. The triode 119 is normally conducting; in fact by reason of the direct cathode return to ground the triode is saturated, so that a steady anode current flows through relay coil 122 thereby positioning the relay armature 124 in the position in contact with the terminal x as indicated by the solid arrow 124. The triode 119 is in fact saturated since none of the diodes 71, 72, 73 are conducting, their anodes being at ground potential supplied through the resistor 116 whereas their cathodes are also at ground potential supplied through the resistor pairs 41 and 41′, 42 and 42′, and 43 and 43′, derived from terminal pairs 21b and 61, 22b and 62, 23b and 63 respectively, as explained hereinabove. In the event of cut-off of the triode 119 its anode current would cease to flow and consequently the armature 124 would be released to contact terminal y and assume the alternate position indicated by the broken line 124′ arrow thereby closing a circuit 125. Circuit 125 extends from a terminal 125a supplied by the voltage source V to the contact y, via the relay armature 124′, via the line 126 to a terminal 127 of a rotary solenoid 128, through the stator winding of solenoid 128, thence to the other terminal 129 of said rotary solenoid, and via the line 130 to the other terminal 125b supplied by the source V. When the circuit 125 is closed the rotary solenoid 128 is energized and its rotor, which is unidirectionally rotatable (herein counter-clockwise), is rotated in discrete steps; i. e. the rotor will rotate through a fraction of one revolution, come to a stop temporarily, rotate through an equal fraction of a revolution, come to another stop momentarily, etc. Rotary solenoids are well-known in the art and are manufactured, for example, by the Oak Manufacturing Company under the trademark Ledex. In particular the rotary solenoid 128 is arranged to complete one revolution in eight steps corresponding to the eight switch positions of the switch wafers 101a, 103a, 101b, and 103b, the rotor also being ganged to the shaft 104b. The arrangement is such that as the rotor of the solenoid 128 advances by ⅛ of a revolution from the position indicated the wafers 101b and 103b will assume switch position 2; similarly upon completion of an additional ⅛ revolution the wafers 101b and 103b will assume switch position 3, etc.

The operation of the triode 119 is essentially of a bi-stable nature in that within wide limits, determined by the minimum current required for actuation of the relay 123, it is only of circuit significance that said triode 119 be either conducting to an extent sufficient to actuate the relay or insufficient for actuation. Therefore, it is not necessary that the halves of the transformer secondary 108 be accurately balanced, nor is it necessary that the mates of the resistor pairs 31b and 31b′, 32b and 32b′, 33b and 33b′, or the mates of the resistor pairs 41 and 41′, 42 and 42′, 43 and 43′, or even the characteristics of the diodes 71, 72, 73 be closely matched, for the most unfavorable condition to be encountered is that of a slight unbalance current being drawn through one or more of said diodes, resulting in a negative bias of the grid 118, which negative bias however is insufficient to reduce the anode current to a magnitude sufficient to actuate relay 123.

To facilitate understanding of the operation of the apparatus, let it be assumed that the operator at the master station A manually changes the positions of the wafers 101a and 103a from the indicated position 1 to the position 2 whether by counter-clockwise or clock-wise rotation. The contact 11a and therefore the terminal 21b and junction 51 will be at ground potential as in the previous switch position 1 owing to the grounding by the collector 105a. Similarly the contact 13a and therefore the terminal 23b will retain their previous ungrounded circuit condition. The contact 12a, which in the first switch position had not been grounded, is grounded in the second switch position since the projecting portion 105a1 will now also be connected to contact 12a. On the other hand junction 62 is still at its previous potential, substantially equal to the potential of end 113 of the secondary 108. Consequently an unbalanced circuit condition exists as between junction 62 and terminal 22b and junction 52 is no longer at ground potential, resulting in a flow of rectified current through the diode 72, and a negative bias is developed across resistor 116 thereby cutting-off the triode 119. Triode anode current ceases to flow, releasing armature 124 to connect to terminal y thereby actuating the rotary solenoid 128 which in a first step rotates counter-clockwise through ⅛ of a revolution thereby advancing the wafers 101b and 103b to the position 2. Considering the wafer 103b in the position 2 it is apparent that the selector contact 12b will now be grounded through the collector contact 105b thereby changing the potential at junction 62 to ground potential, establishing balanced ground potentials at terminals 22b and 62, terminating the flow of rectified current through the diode 72 and restoring zero bias to the grid 118. Once more the triode 119 is thrown into conduction, reverting contact 124 to the left-hand position and opening the energizing circuit 125 of the rotary solenoid 128, which therefore will advance no more and consequently leave the wafers 101b, 103b in a position 2 matching the position 2 of wafers 101a and 103a, so that slave station B is tuned to the same frequency as is master station A.

In order to achieve such operation it is necessary that the time constant of the rectifier load comprising resistor 116 and capacitor 117 be less than the response time of the relay 123 including the time required for the armature 124 to shift from the position $x$ to the position $y$ or vice versa. If the converse were the case, the contact 124 would stay in one or the other positions longer than desired, thereby permitting the rotor of solenoid 128 to advance beyond the desired position. The resistor 116 should be large enough so that conduction of merely one diode is sufficient to develop triode cut-off bias across said resistor 116.

From the aforegoing it is apparent that the operation of the apparatus is governed by the binary nature of operation of the selector contacts 11a, 12a, etc., and 11b, 12b, etc., in that such contacts may be either grounded or not grounded. So long as a selector contact such as 11a is grounded and its mate such as 11b is also grounded, the points corresponding to 21b and 61 are balanced and no current flows through the associated diode such as 71 capable of activating the rotary solenoid 128. The same considerations hold true in the event that a contact such as 11a is not grounded while its mate such as 11b likewise is not grounded. So long as each of the contacts 11a, 12a, 13a is in the same circuit condition as its mate 11b, 12b, 13b respectively, the rotary solenoid 128 is not activated. In the event that at least one contact such as 11a is not in the same condition as its mate such as 11b (i. e. one grounded and the other not grounded) an unbalance condition is established as between the points corresponding to 21b and 61 causing a current to flow through the associated diode corresponding to 71 thereby cutting off the triode 119 with a consequent actuation of the rotary solenoid 128. Thereafter the solenoid 128 will remain active to rotate the collectors 102b and 105b through as many steps as are required to reestablish balance as between the mates of each pair of terminals 21b and 61, 22b and 62, 23b and 63 so that ultimately none of the diodes will conduct, whence once more triode 119 is thrown into conduction and the rotary solenoid 128 is deactivated.

Because of the aforesaid binary nature of operation of the contacts 11a etc. it is possible to construct the collector 105a (and for that matter its mate 105b) in such a manner that in one switch position of the wafer 103a all three contacts 11a, 12a, 13a will be grounded, in another switch position none of the contacts 11a, 12a and 13a will be grounded, in three distinct positions only one of these contacts will be grounded (namely only contact 11a in one position, only 12a in another position, and only 13a in the third position), and in three other distinct positions only such contacts as constitute the possible combinations of two contacts at a time will be grounded whereas the third will not (i. e. in one position the contacts 11a and 12a will be grounded, in another position the contacts 12a and 13a will be grounded, and in the third position contacts 11a and 13a will be grounded). The total number of distinct positions thus is eight so that with $n$ equal to three, only three selector contacts 11a, 12a, and 13a and associated lines 11, 12, and 13 are required. More generally for a main wafer 101a having $2^n$ positions it is possible to arrange the collector 105a so that with $n$ associated selector contacts in one switching position all of the $n$ contacts are grounded, in one switching position none of the $n$ contacts are grounded, and in a number of distinct positions such contacts as constitute the possible combinations of 1, 2, 3 ... $(n-1)$ contacts at a time, are grounded. The total number of all of the aforementioned combinations (including the positions wherein all of the contacts are grounded at one time and none of the contacts are grounded at one time) can be shown mathematically to be equal to $2^n$; therefore merely $n$ control selector contacts and therefore $n$ associated control leads are required of the auxiliary wafer 103a (or 103b) for $2^n$ switching positions, as contrasted to $n+1$ selector contacts in accordance with apparatus heretofore known. A switching schedule or program for an eight position switch ($n=3$) is shown in Table I, wherein the letter Y signifies that the pertinent selector contact is grounded, whereas the letter N indicates that the pertinent selector contact is not grounded.

*Table I*

| Switch Position | Selector Contact | | |
|---|---|---|---|
| | 11 | 12 | 13 |
| 1 | Y | N | N |
| 2 | Y | Y | N |
| 3 | Y | Y | Y |
| 4 | N | Y | Y |
| 5 | Y | N | Y |
| 6 | N | Y | N |
| 7 | N | N | Y |
| 8 | N | N | N |

Table I is applicable to both auxiliary wafers 103a and 103b.

From an examination of Table I it is apparent that if the switch 100a is in any one of the eight positions whereas the switch 100b is in any other of the remaining seven positions there is at least one non-identity of contact condition as between one of the mates of the pairs 11a and 11b, 12a and 12b, and 13a and 13b with respect to the other. In such case at least one of the diodes 71, 72 and 73 will be rendered conductive thereby activating the rotary solenoid 128 which will rotate the wafers 101b and 103b in discrete sequential steps. So long as in any of these steps non-identity of condition of at least one contact terminal of the group 11a, 12a, and 13a exists with respect to the condition of the mates 11b, 12b, and 13b respectively, the rotary solenoid 128 will continue to advance through as many more steps as are required to establish identity of condition of each contact with respect to the condition of its contact mate.

The construction of the collector contact 105a (or 105b) can be determined at once by reference to the column in Table I appearing under selector contact 11.

Thus it is noted that in switch positions 1, 2, and 3 selector contact 11 is grounded requiring the projecting portion 105a1 capable of grounding three consecutive selector contacts. In switch position 1 portion 105a1 spans the arcuate space between contact 11a and broken line 17a protruding slightly beyond each. In switch position 4 the letter N signifies that selector contact 11 is not grounded requiring an absence of a projecting portion adjacent to the broken line 16a. In the position 5 the letter Y appears for selector contact 11 not followed by the letter Y in position 6, therefore requiring the elevated portion 105a2 capable of grounding only one contact at a time. In switch position 1 portion 105a2 lies adjacent to the broken line 15a. The letter N appears for each of the positions 6, 7, and 8, requiring the absence of any projecting portion adjacent to the broken line 14a and the contacts 13a and 12a.

It can be shown that for an eight-position switch and for an arcuate spacing between contacts 11 and 12 of ⅛ revolution and an equal arcuate spacing between contacts 12 and 13 the functional construction of the collector 105 is unique. Under the same assumed conditions of equiangular spacing of consecutive selector contacts of the auxiliary wafer at intervals of $$\frac{1}{2^n}$$

of a revolution, only one functional collector construction is possible for the cases of $n=1$ or $n=2$. On the other hand for $n$ greater than three and with increasing $n$, more and more possible functional constructions for the collector 105 become possible.

Thus for a 16-position switch ($n=4$) the switching schedules or programs shown in Tables II, III, IV and V can be derived, wherein the selector contacts are numbered sequentially as 201, 202, 203, and 204.

*Table II*

| Switch Position | Selector Contact | | | |
|---|---|---|---|---|
| | 201 | 202 | 203 | 204 |
| 1 | Y | N | N | N |
| 2 | Y | Y | N | N |
| 3 | Y | Y | Y | N |
| 4 | Y | Y | Y | Y |
| 5 | N | Y | Y | Y |
| 6 | Y | N | Y | Y |
| 7 | Y | Y | N | Y |
| 8 | N | Y | Y | N |
| 9 | N | N | N | Y |
| 10 | Y | N | N | Y |
| 11 | N | Y | N | N |
| 12 | Y | N | Y | N |
| 13 | N | Y | N | Y |
| 14 | Y | Y | N | Y |
| 15 | N | N | N | Y |
| 16 | N | N | N | N |

*Table III*

| Switch Position | Selector Contact | | | |
|---|---|---|---|---|
| | 201 | 202 | 203 | 204 |
| 1 | Y | N | N | N |
| 2 | Y | Y | N | N |
| 3 | Y | Y | Y | N |
| 4 | Y | Y | Y | Y |
| 5 | N | Y | Y | Y |
| 6 | Y | N | Y | Y |
| 7 | N | Y | N | Y |
| 8 | Y | N | Y | N |
| 9 | Y | Y | N | N |
| 10 | N | Y | Y | N |
| 11 | N | N | Y | Y |
| 12 | Y | N | N | Y |
| 13 | N | Y | N | N |
| 14 | N | N | Y | N |
| 15 | N | N | N | Y |
| 16 | N | N | N | N |

*Table IV*

| Switch Position | Selector Contact | | | |
|---|---|---|---|---|
| | 201 | 202 | 203 | 204 |
| 1 | Y | N | N | N |
| 2 | Y | Y | N | N |
| 3 | Y | Y | Y | N |
| 4 | Y | Y | Y | Y |
| 5 | N | Y | Y | Y |
| 6 | N | N | Y | Y |
| 7 | Y | N | N | Y |
| 8 | N | Y | N | N |
| 9 | Y | N | Y | N |
| 10 | Y | Y | N | Y |
| 11 | N | Y | Y | N |
| 12 | Y | N | Y | Y |
| 13 | N | Y | N | Y |
| 14 | N | N | Y | N |
| 15 | N | N | N | Y |
| 16 | N | N | N | N |

*Table V*

| Switch Position | Selector Contact | | | |
|---|---|---|---|---|
| | 201 | 202 | 203 | 204 |
| 1 | Y | N | N | N |
| 2 | Y | Y | N | N |
| 3 | Y | Y | Y | N |
| 4 | Y | Y | Y | Y |
| 5 | N | Y | Y | Y |
| 6 | Y | N | Y | Y |
| 7 | N | Y | N | Y |
| 8 | N | N | Y | Y |
| 9 | Y | N | N | Y |
| 10 | N | Y | N | N |
| 11 | Y | N | Y | N |
| 12 | Y | Y | N | Y |
| 13 | N | Y | Y | N |
| 14 | N | N | Y | Y |
| 15 | N | N | N | Y |
| 16 | N | N | N | N |

The corresponding functionally only possible auxiliary wafer collector constructions are shown in respectively Fig. 3a, Fig. 3b, Fig. 3c, and Fig. 3d.

The auxiliary collector 105a in Fig. 1 is designed to accommodate thirty-two positions ($n=5$) and is derived from the following switching schedule, Table VI, it being understood that many more switching schedules and corresponding collector constructions are possible for the case of $n=5$.

*Table VI*

| Switch Position | Selector Contact | | | | |
|---|---|---|---|---|---|
| | 11 | 12 | 13 | 14 | 15 |
| 1 | Y | N | N | N | N |
| 2 | Y | Y | N | N | N |
| 3 | Y | Y | Y | N | N |
| 4 | Y | Y | Y | Y | N |
| 5 | Y | Y | Y | Y | Y |
| 6 | N | Y | Y | Y | Y |
| 7 | Y | N | Y | Y | Y |
| 8 | Y | Y | N | Y | Y |
| 9 | Y | Y | Y | N | Y |
| 10 | N | Y | Y | Y | N |
| 11 | N | N | Y | Y | Y |
| 12 | Y | Y | N | N | Y |
| 13 | Y | Y | N | N | N |
| 14 | N | Y | Y | N | N |
| 15 | Y | N | Y | N | Y |
| 16 | Y | N | N | Y | N |
| 17 | Y | Y | N | N | Y |
| 18 | N | Y | N | Y | N |
| 19 | N | N | Y | N | Y |
| 20 | Y | N | N | Y | N |
| 21 | N | Y | N | N | Y |
| 22 | Y | N | Y | N | N |
| 23 | Y | Y | N | N | Y |
| 24 | N | Y | Y | N | N |
| 25 | N | N | Y | Y | N |
| 26 | N | N | N | Y | Y |
| 27 | Y | N | N | N | Y |
| 28 | N | Y | N | N | N |
| 29 | N | N | Y | N | N |
| 30 | N | N | N | Y | N |
| 31 | N | N | N | N | Y |
| 32 | N | N | N | N | N |

Subject to the assumptions indicated before, functionally only one auxiliary collector construction is possible for each of the cases of a four-position switch ($n=2$) and a two-position switch ($n=1$) which are respectively shown in Fig. 3e and Fig. 3f. The switching schedules from which Fig. 3e and Fig. 3f are derived are respectively presented in Tables VII and VIII.

*Table VII*

| Switch Position | Selector Contact | |
|---|---|---|
| | 201 | 202 |
| 1 | Y | N |
| 2 | Y | Y |
| 3 | N | Y |
| 4 | N | N |

*Table VIII*

| Switch Position | Selector Contact 201 |
|---|---|
| 1 | Y |
| 2 | N |

So far only such switching arrangements have been considered as have a number of positions equal to an exact power of 2. In Fig. 3g and Fig. 3h there are shown two possible auxiliary control wafer collector patterns for a three-position switch derived from the following Tables IX and X respectively.

*Table IX*

| Switch Position | Selector Contact | |
|---|---|---|
| | 201 | 202 |
| 1 | Y | N |
| 2 | N | Y |
| 3 | N | N |

*Table X*

| Switch Position | Selector Contact | |
|---|---|---|
| | 201 | 202 |
| 1 | Y | N |
| 2 | Y | Y |
| 3 | N | Y |

Two selector contacts 201 and 202 are required in the case of a three-position switch as were also required in the case of a four-position switch. However in Table IX the possible combination corresponding to switch position 2 in Table VII is not availed of, whereas in Table X the possible combination corresponding to switch position 4 in Table VII is not availed of. In general where the number of switch positions is not an exact power of two, as many auxiliary wafer selector contacts and associated leads will be required as are required of the switch having a number of positions equal to the next highest exact power of two. In that sense a switch having a number of positions not equal to an exact power of 2 will require an auxiliary control wafer which is not utilized more efficiently.

The number of selector contacts, leads, and associated control circuits may be expressed so as to cover multi-position switches in general, whether the number of positions is or is not an exact power of two. For a switch having a number of positions $2^n+p$, the required number of control circuits is $n+1$, where $n$ is any positive integer (including 0) and $p$ is also a positive integer satisfying the relation $1 \leq p \leq 2^n$. As the switch traverses the $2^n+p$ positions, such contacts as constitute $2^n+p$ of the possible $2^{n+1}$ combinations of $(n+1)$, $n$, $(n-1)$—1, 0 contacts at a time are grounded.

As stated before, if additional slave stations C, D, etc., are required, it is merely necessary to duplicate the circuitry shown within the block BB in said additional stations C, D, etc. Alternatively in accordance with another form of the invention, the relay 123 is provided with a number of additional armatures similar to 124 equal to the number of additional slave stations desired, which additional armatures 124 in the position y complete energization circuits similar to 125. Such energization circuits are connected to the common source V for energizing additional rotary solenoids in each additional slave station, said additional solenoids corresponding to the rotary solenoid 128 and being ganged to respectively the connections 104c, 104d, etc. In such case all other corresponding circuitry in said additional stations are omitted.

However the duplication of the entire circuitry within block BB in each of the additional slave stations is advantageous if it is desired to introduce additional slave stations with the master and at least one slave station already in operation without necessity to interrupt their service and without necessity to notify the installer of the switch position of the existing master and slave stations. Thus if originally only stations A and B had been installed and were in operation, the installer of the slave station C to be introduced would merely be required to connect leads from the terminals 21c, 22c, ... 2nc and from the terminal 114c to respectively the lines 11, 12, ... 1n and 112 and an interconnecting ground wire, and thereafter turn on the power in the station C, whence the switch 101c would align itself automatically with the master station switch 101a.

Many modifications of the basic apparatus are possible. For example, the relation of the collector contact and the selector contacts may be inverted, i. e. the former may be made stationary and the latter rotatable. It is also possible to invert the position of each of the diodes 71, 72, ... 7n, and accordingly normally bias the triode 119 to below cut-off instead of to saturation and connect the terminal x instead of the terminal y to the source V. The advantage of this alternative arrangement lies in the fact that no anode current is drawn by the triode 119 except when necessary to align a slave station with the master station A. However, the arrangement hereinbefore described and illustrated in Fig. 2 possesses the advantage that in the event of failure of the voltage B+ the rotary solenoid 128 operates continuously, thereby indicating such failure.

The previously described operation of the apparatus has been essentially "one-way" or unilateral in that the master station switching operation is performed externally manually or externally automatically whereas the slave station switching operations are performed internally automatically. In certain instances it may be desirable to provide "two-way" or bilateral operation; i. e. whenever the tuning at any one station (whether heretofore designated as master or slave station) is changed, it is desired to automatically retune the remaining stations accordingly. To this end the master station could be provided with the complete apparatus shown in the block BB in Fig. 2 and the connections 104a, 104b, 104c, etc., arranged for external manual or external automatic as well as internal automatic actuation. However, in such case it would be necessary to arrange the detents associated with these connections to assure merely unidirectional (herein counter-clockwise) rotation, as otherwise an attempted external clockwise rotation in a particular station would be opposed by an attempted counter-clockwise internal actuation in the same station. Alternatively one could provide suitable reversing switch means for bidirectional operation of the rotary solenoids as typified by 128, connected to suitable circuit means for sensing at remote stations the direction of manual rotation of the local station so as to rotate each solenoid in the same direction as the externally actuated switch. Whichever of the aforegoing alternatives is adopted, difficulty in the form of a runaway condition may still be encountered in the event that the external switching is performed at a high speed compared to the rate of solenoid rotation. In such instance, it is possible that the solenoid in the local station, whose switch position has been changed rather rapidly due to external operation, is still subject to the local internal automatic actuation, in which case the local rotary solenoid would continue to change the local switch position and all other remote solenoids would do likewise. Moreover, since no switch is now at a permanent position all switches would rotate continuously and not come to a stop, not "knowing" to which other switch position to align themselves.

Accordingly there is shown in Fig. 4 a form of the invention suitable for "two-way" or bilateral operation which includes means for precluding the aforementioned run-away condition and also admits of external operation in either direction. In Fig. 4 the number of switch positions is limited to four and merely station B is illustrated in detail, it being understood that station A and any additionally desired stations C, D, etc., contain apparatus functionally identical to that shown within the block BB.

Referring to Fig. 4 the connections 104b include a rotatable shaft 302 to which is keyed for rotation therewith a spur gear 304 which meshes with an idler pinion 305, which in turn meshes with another spur gear 306, which is keyed to a rotatable shaft 308 for rotation therewith. A manually operable selector knob 310 is keyed to the end of the shaft 308, so that when an operator changes the local station tuning manually by rotation of the knob 310, such operation rotates shaft 308 and gear 306, which through the idler 305 in turn drives the gear 304 and the shaft 302 to effect the desired tuning change. The idler pinion 305 is provided for maintaining the assumed counter-clockwise direction of rotation as the normal direction, solely as a matter of convenience in the description. It could be dispensed with, in which case the gear 306 would be arranged to mesh directly with the gear 304. The knob 310 is provided with a dial pointer 311 to indicate the selected frequency on a dial (not shown). The end of the shaft 302 is connected to the shaft 312 of the rotary solenoid 128 by means of a friction drive arrangement generally indicated as 313 and described in detail hereinafter.

A single-pole double-throw momentary push-button switch 314 is secured to the side of the knob 310 so that as the operator manually rotates the knob 310 he also actuates the switch 314. Said switch 314 is indicated schematically at 314'. It comprises a common terminal 316 and two selector terminals 318 and 320. Normally, i. e. in the absence of manual actuation, the switch is in the position bridging contacts 316 and 318 as indicated by the solid arrow 321. Upon manual actuation contacts 316 and 320 are bridged as indicated by the broken-line arrow 321'. The contacts 316 and 318 are included in the line 322 connecting terminal 125a and terminal y in circuit 125, and in the normally bridged position permit possible energization of the rotary solenoid 128 in response to a change in switch position at a remote station. Upon actuation of the switch 314, however, the energization circuit 125 for the rotary solenoid 128 is broken and local energization is thereby precluded. To insure that the energization circuit 125 shall remain disabled for a predetermined time however quickly the push-button switch 314 is released, additional holding circuit means are provided. To this end a line 323 extends from the terminal 125a supplied by the voltage source V to the common contact 324 of a relay 326 the armature of which is normally (i. e. in the absence of actuation of the switch 314) in the position indicated by the solid arrow 328. One end of the coil 330 of the relay 326 is connected to the terminal 320 of switch 314' and its other end is connected to the other terminal 125b of the voltage source V via the contact 332 and line 334. That end of the relay coil 330 which is connected to the contact 320, is also connected to a terminal 337 to which the armature 328 connects in the event of energization of the coil 330 to assume the alternate position indicated by the associated broken line arrow 328'.

Upon actuation of the switch 314 the connection 316—318 is broken as previously indicated to preclude energization of the rotary solenoid 128, and at the same time the connection 316—320 is made thereby completing an energizing circuit for the relay 326. Such actuation marks the beginning of a preclusion cycle. A current flows from the terminal 125a to the terminal 316, through the contact 321, to the terminal 320, through the relay coil 330, through the contact 332 to the terminal 125b. This current energizes the relay coil 330 thereby shifting the relay armature 328 to the alternate position indicated as 328' and completing an additional energization circuit for the coil 330. This additional circuit extends from the terminal 125a via the line 323 to the terminal 324, through the armature 328 to the relay terminal 337, through the coil 330 through the contact 332 to the terminal 125b. The relay armature is provided with a second section 338 which normally bridges contacts 340 and 342 in the line 322. Upon energization of the coil 330 however, the armature section 338 is shifted to the position indicated by the broken line arrow 338' thereby providing a second breaking of the line 322 in addition to the breaking occasioned by the actuation of switch 314. Even though the switch 314 be released rather quickly the additional energization circuit for the relay coil 330 keeps said coil 330 energized and the associated relay armatures 328' and 338' in the positions indicated by respective broken lines to preclude energization of the local rotary solenoid 128. Since the preclusion is intended to be only temporary, it is necessary to provide circuit means for restoring the armatures 328 and 338 to their normal positions after some time delay.

To this end the armature of relay 326 is provided with a third section indicated by the solid arrow 344 which normally bridges a common grounded contact 346 to the contact 348 thereby normally grounding the grid 350 of a triode 352 through the line 353 connecting contact 348 to grid 350. The cathode 354 of the triode is connected through a resistor 356 to a voltage divider point 358 to which a relatively high positive voltage is supplied from the positive terminal of the voltage source B+ through resistor 360, thence through the resistor 362 to ground, thereby normally biasing the triode 352 considerably below cut-off. The anode 364 is connected through the winding 366 of a relay 368 to the positive terminal of the voltage B+. The armature associated with the relay 368 is in fact the aforementioned contact 332 which normally connects the relay coil 330 via the line 334 to the terminal 125b. Normally no anode current flows through the triode 352 in view of the cut-off bias provided. Upon energization of the relay coil 330 however, the armature section 344 assumes the alternate position indicated by the broken line arrow 344', thereby opening the short circuit of the grid 350 to ground. Thereafter the voltage at the grid 350 slowly builds up towards the potential B+ because of the charging of a condenser 370 through the variable resistor 372, one end of each of which is connected to the grid 350 and the other ends of which are respectively connected to ground and to the positive terminal of the voltage B+. Although the voltage at the grid 350 is building up, initially no anode current flows as yet until after the cut-off voltage has been passed. Thereafter an anode current flows but is as yet insufficient to energize the relay coil 366 to an extent necessary for actuating its armature 332. Some time thereafter, which time may be regulated by the adjustment of the resistor 372, the anode current passing through coil 366 is sufficient to actuate the armature 332 and to throw it into the position indicated by the broken arrow 332', thereby opening the energization circuit for the relay coil 330, reverting the associated armatures 328, 344 and 338 to their normal positions, once more grounding the grid 350 and rapidly discharging capacitor 370, cutting off the triode 352, and reverting the armature 332 to its normal position, thus ending the preclusion cycle.

The time constant of the combination of the resistor 372 and capacitor 370 may be adjusted, for example, so that the period of a preclusion cycle exceeds the maximum possible time interval during which an operator is reasonably expected to actuate the switch 314, plus the time required for one complete revolution of the rotary solenoid 328. Consequently the line 322 must remain open for the maximum possible time required of the other solenoids to come to their final position. If at the end of the cycle the operator were still actuating the switch 314, energization of the local rotary solenoid 128 would, of course, continue to be precluded in view of the breaking of the connections 316—318. At the same time another cycle would begin and the cycles would be repeated so long as the operator actuated the switch 314 at the end of a cycle and thus reenergized relay coil 330.

The arrangement so far described is satisfactory in preventing the run-away condition, but additionally it may be desirable to preclude manual actuation of the rotor of the rotary solenoid 128 during the period of a preclusion cycle, especially in the event of manual clockwise rotation of the switches 101b and 103b, where the frictional opposition torque of the rotor may be sufficiently great to hinder manual operation.

To this end the relay 326 is provided with yet another armature section 372 for effecting disconnection of the friction coupling 313. Said coupling comprises a disc member 374 which is rigidly secured to the other end of the shaft 302 for rotation in unison therewith, whereas another disc member 376 is rigidly secured to the end of a shaft 377 for rotation in unison therewith. A spur gear 378 is keyed to the other end of the shaft 377 for rotation in unison therewith and meshes with another spur kear 379 which is keyed to the end of the shaft 312 for rotation in unison therewith. The gears 378 and 379 are provided for maintaining the assumed counter-clockwise direction of rotation as the normal direction, solely as a matter of convenience in the description. They could be dispensed with, and the disc member 376 be keyed directly to the end of the shaft 312.

The disc member 374 may have a larger diameter than the disc member 376 to effect a speed reduction through the intervening agency of a connecting friction disc member 380. Member 380 is normally in engagement with the members 374 and 376 and thereby completes the coupling connection from the shaft 312 to the shaft 302. Member 380 is rigidly secured to a shaft 381 for rotation in unison therewith. Such rotation occurs in the case of engagement by the disc member 380 of the disc members 376 and 374 when the shaft 312 is rotated as a result of switching at a remote station. Upon such remotely originated rotation the rotary motion of the shaft 312 is imparted to the gears 379 and 378, to the shaft 377, to the member 376, to member 380, to member 374, to the shaft 302 to position the switch 100b ultimately to its required position. The shaft 302 also rotates the gear 304, which through idler 305 in turn rotates the gear 306, the shaft 308 and the knob 310, so that the pointer 311 indicates the selected tuning frequency on the dial.

The shaft 381, in addition to being rotatable within suitable journals 382 and 384 is also arranged to axially slide within the bores of said journals 382 and 384. Magnetic members 386 and 388 are rigidly secured to the ends of the shaft 381, and the member 380 is held in the normally engaged position owing to the magnetic attraction of the member 386 by the electromagnet 390, which comprises a core 392 made of a magnetic material and a coil 394 wound therearound for carrying a magnetizing current. One end of the coil 394 is grounded whereas the other end is connected via the line 396 to terminal 398 with which the armature 372 normally makes contact thereby bridging terminal 398 to the common terminal 400 which in turn is connected to the positive terminal of a direct voltage source $E_{dc}$ whose negative terminal is grounded. Normally a magnetizing current flows through the described circuit to energize the coil 392 and hold the disc member 378 in the engaged position. Since mere magnetic actuation might result in bounce of the member 378, additional mechanical means are provided to more positively assure engagement. Such means comprise one or more angularly spaced lever members 402, one end of each of which is pivotally connected as at 404 and towards the other end of which there is provided a recess portion 406, wherein a ball 408 is free to revolve. The ball 408 engages the inner surface of the member 386 and is held in engagement through the urging of a tension spring 410 connected to the lever 402. The lever 402 is also made of a magnetic material, so that both magnetic action and mechanical action force and keep the member 380 in engagement.

When the relay coil 330 is energized by actuation of the push-button switch 314, the armature 372 is thrown into the alternate position indicated by the broken line arrow 372' thereby breaking the aforedescribed magnetizing circuit and making another magnetizing circuit. Owing to the breaking of connection between the terminals 398 and 400 the member 386 and the lever 402 are no longer subject to magnetic attraction by the magnet 390 and therefore are relatively free to assume an alternate disengaged position, the tension of the spring 410 alone being insufficient to maintain the engaged position. When the armature 372 assumes the alternate position indicated by the broken line arrow 372' another magnetizing circuit is established, extending from the positive terminal of the voltage $E_{dc}$ to the terminal 400, to the contact 413, over the line 414 to the coil 414' of a similar electromagnet 418 to ground. Coil 414' is wound about a similar core 418 to ground. By reason of such magnetization the other magnetic member 388 is attracted to the magnet 418 to positively assure disengagement of the clutch member 380, but its travel is limited by the stops 422 and 424. The magnetic action is reinforced by mechanical means which comprise one or more similar magnetic levers 426 pivotally mounted towards one end as at 428 and also having a recess portion 430 wherein a similar ball 432 is free to revolve and engage the member 388. A similar tension spring 434 assures positive urging of lever 426 towards the member 388 through the intervening agency of the ball 432. When ultimately the relay coil 330 is deenergized the armature section 372 resumes the normal position bridging the terminals 398 and 400, thereby discontinuing magnetizing current through the coil 416 and reestablishing magnetizing current through the coil 392 and causing once more the engagement of the member 380 with the members 374 and 376. Since the magnetizing current for the coils 392 and 416 may be rather heavy, capacitors 436 and 438 are connected respectively across the terminals 400 and 413, and 400 and 398 to minimize sparking upon making or breaking of the respective circuits. The remaining circuitry in Fig. 4 is similar to that shown in Fig. 2 and requires no further discussion. As in the case of one-way operation, additional stations may be readily added. Moreover, because of the absence of a true master station, some or all of the terminals 114c, 114b, etc., may be tied to the end 107 of the transformer secondary 108 instead of solely to the end 113 of this secondary. For this reason another interconnecting line 112" is brought out from the end 107 of the secondary which line 112" is functionally similar to the line 112' brought out from the terminal 113 of the secondary.

Thus it will be seen that in the form of invention illustrated in Fig. 4, there is provided a bilaterally operable switch positioning system, which includes means for precluding energization of the local internal automatic positioning means responsive to local external positioning, means for continuing such preclusion thereby to prevent a run-away condition, and means for disengaging the local internal automatic switch positioning means thereby to facilitate external positioning, each for a predetermined time substantially equal to the aforementioned period of preclusion of energization of the local internal automatic switch positioning means.

It is to be understood that the embodiments described have been presented by way of illustration and not by way of limitation, reference being had to the appended claims rather than to the aforegoing specification to determine the scope of the invention.

What is claimed is:

1. A system for maintaining correspondence of positions of a first and second switch each having $2^n+p$ discrete positions, where $n$ is a positive integer including zero and $p$ is an integer satisfying the relation $1 \leqslant p \leqslant 2^n$ comprising in combination means for applying first and second input voltages between a point of reference potential and respectively a first and second input terminal; $n+1$ control networks connected across said input terminals each having a first and second circuit junction point located in balanced circuit relation to one another relative to said point of reference potential; auxiliary switching means for placing with the traverse of said first switch at a first of two possible potentials distinct $2^n+p$ combinations of 0, 1, 2, . . . $n$, $n+1$ of said first circuit junction points at a time and the remaining of said first junction points at the second possible potential; auxiliary switching means for placing with the traverse of said second switch at a first of two possible potentials balanced normally with the aforesaid first potential relative to said reference potential the respectively corresponding $2^n+p$ combinations of 0, 1, 2, . . . $n$, $n+1$ of said second junction points at a time and the remaining of said second junction points at the second possible potential balanced normally with the aforesaid second potential relative to said reference potential; and means responsive to unbalance of potentials of the junction points of at least one of said networks due to non-correspondence of switch positions for sequentially positioning one of said switches so as to reestablish potential balance of the junction points of each of said networks and correspondence of switch positions.

2. A system for maintaining correspondence of positions of an externally positionable master switch and an internally positionable slave switch each having $2^n+p$ discrete positions, where $n$ is a positive integer including zero and $p$ is an integer satisfying the relation $1 \leqslant p \leqslant 2^n$, comprising in combination means for applying first and second input voltages between a point of reference potential and respectively a first and second input terminal; $n+1$ control networks connected across said input terminals each having a first and second circuit junction point located in balanced relation to one another relative to said point of reference potential; auxiliary switching means for placing with the traverse of said master switch at a first of two possible potentials distinct $2^n+p$ combinations of 0, 1, 2, . . . $n$, $n+1$ of said first circuit junction points at a time and the remaining of said first circuit junction points at the second possible potential; auxiliary switching means for placing with the traverse of said slave switch at a first of two possible potentials balanced normally with the aforesaid first potential relative to said reference potential the respectively corresponding $2^n+p$ combinations of 0, 1, 2, . . . $n$, $n+1$ of said second circuit junction points and the remaining of said second circuit junction points at the second possible potential balanced normally with the aforesaid second potential relative to said reference potential; and means responsive to unbalance of potential as between the circuit junction points of at least one of said networks due to changed master switch position for sequentially positioning said slave switch so as to reestablish potential balance of the junction points of each of said networks and correspondence of switch positions.

3. A system for maintaining correspondence of positions of an externally positionable master switch and a plurality of internally positionable slave switches, each of said switches having $2^n+p$ discrete positions, where $n$ is a positive integer including zero and $p$ is an integer satisfying the relation $1 \leqslant p \leqslant 2^n$, comprising in combination means for applying first and second input voltages between a point of reference potential and respectively a first and second input terminal; first, second . . . $n$, $n+1$ control networks connected across said input terminals each having a first and second circuit junction point located in balanced relation to one another relative to said point of reference potential; auxiliary switching means for placing with the traverse of said master switch at a first of two possible potentials distinct $2^n+p$ combinations of 0, 1, 2, . . . $n$, $n+1$ of said first circuit junction points at a time and the remaining of said first circuit junction points at the second possible potential; auxiliary switching means for placing with the traverse of one of said slave switches at a first of two possible potentials balanced normally with the aforesaid first potential relative to said reference potential the respectively corresponding $2^n+p$ combinations of 0, 1, 2, . . . $n$, $n+1$ of said second circuit junction points at a time and the remaining of said second circuit junction points at the second possible potential balanced normally with the aforesaid second potential relative to said reference potential; and a means associated with each of said slave switches responsive to unbalance of potential of the circuit junction points of at least one of said networks due to changed master switch position for sequentially positioning its respective slave switch so as to reestablish potential balance of the junction points of each network and correspondence of the positions of all said switches.

4. A system for maintaining correspondence of positions of an externally positionable master switch and a plurality of internally positionable slave switches, each of said switches having $2^n+p$ discrete positions, where $n$ is a positive integer including zero and $p$ is an integer satisfying the relation $1 \leqslant p \leqslant 2^n$, comprising in combination means for applying first and second input voltages between a point of reference potential and respectively a first and second input terminal; $n+1$ control circuit means connected from said first input terminal respectively to $n+1$ first circuit junction points; one group associated with each one of said slave switches, of $n+1$ slave switch control networks connected from said second input terminal respectively to said $n+1$ first circuit junction points, each of said networks provided with a second circuit junction point located in balanced relation to the first circuit junction point of its network relative to said point of reference potential; auxiliary switching means for placing with the traverse of said master switch at a first of two possible potentials distinct $2^n+p$ combinations of 0, 1, 2, . . . $n$, $n+1$ of said first circuit junction points at a time and the remaining of said first circuit junction points at the second possible potential; one auxiliary switching means connected to each one of said slave switches for placing with the traverse of its associated switch at a first of two possible potentials balanced normally with the aforesaid first potential relative to said reference potential the respectively corresponding $2^n+p$ combinations of 0, 1, 2, . . . $n$, $n+1$, of the second circuit junction points of its associated group at a time and the remaining second circuit junction points of such group at the second possible potential balanced normally with the aforesaid second potential relative to said reference potential; and one means associated with each one of said slave switches and responsive to unbalance of potential of the circuit junction points of at least one network in its associated group due to changed position of the master switch for sequentially positioning the associated slave switch so as to reestablish potential balance for the junction points of each network of such group and correspondence the positions of all said switches.

5. A system for maintaining correspondence of positions of a first and a second externally and internally positionable switch each having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control networks connected across said input terminals each provided with first and second circuit junction point located in balanced relation to one another relative to said point of reference potential; auxiliary switching means for placing with the traverse of said first switch at a first of two possible potentials distinct $2^n+p$ combinations of 0, 1, 2, . . . $n$, $n+1$ of said first circuit junction points at a time and the remaining of said first circuit junction points at the second possible potential; auxiliary switching means for placing with the traverse of said second switch at a first of two possible potentials balanced normally with the aforesaid first potential relative to said reference potential the respectively corresponding $2^n+p$ combinations of 0, 1, 2, . . . $n$, $n+1$ of said second circuit junction points at a time and the remaining second circuit junction points at the second possible potential balanced normally with the aforesaid second potential relative to said reference potential; means responsive to unbalance of potential of the circuit junction points of at least one of said networks due to external positioning of one of said switches for sequentially internally positioning the other of said switches so as to reestablish potential balance of the circuit junction points of each of said networks and correspondence of switch positions; and means for precluding internal positioning of said one externally positioned switch for a predetermined length of time.

6. A system for maintaining correspondence of positions of a first and a second externally and internally positionable switch each having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control networks connected across said input terminals each provided with first and second circuit junction point located in balanced relation to one another relative to said point of reference potential; auxiliary switching means for placing with the traverse of said first switch at a first of two possible potentials distinct $2^n+p$ combinations of 0, 1, 2, . . . $n$, $n+1$ of said first circuit junction points at a time and the remaining of said first circuit junction points at the second possible potential; auxiliary switching means for placing with the traverse of said second switch at a first of two possible potentials balanced normally with the aforesaid first potential relative to said reference potential the respectively corresponding $2^n+p$ combinations of 0, 1, 2, . . . $n$, $n+1$ of said second circuit junction points at a time and the remaining second circuit junction points at the second possible potential balanced normally with the aforesaid second potential relative to said reference potential; one means associated with each one of said switches and responsive to unbalance of potential of the circuit junction points of at least one of said networks due to external positioning of the other of said switches for sequentially internally positioning its associated switch so as to reestablish potential balance of the circuit junction points of each of said networks and correspondence of switch positions; and one means associated with each one of said switches for disabling for a predetermined length of time the operation of its associated sequential positioning means upon external operation of its associated switch.

7. A system for maintaining correspondence of positions of a first and second switch each having $2^n+p$ discrete positions, where $n$ is a positive integer including zero respectively a first and second input terminal; $n+1$ comprising in combination means for applying first and second input voltages between a point of reference potential and respectively a first and second input terminal; $n+1$ control networks connected across said input terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; auxiliary switching means for placing with the traverse of said first switch at a first of two possible potentials distinct $2^n+p$ combinations of 0, 1, 2, . . . $n$, $n+1$ of said first outer circuit junction points at a time and the remaining of said first outer circuit junction points at the second possible potential; auxiliary switching means for placing with the traverse of said second switch at a first of two possible potentials balanced normally with the aforesaid first potential relative to said reference potential the respectively corresponding $2^n+p$ combinations of 0, 1, 2, . . . $n$, $n+1$ of said second outer circuit junction points at a time and the remaining of said second outer circuit junction points at the second possible potential balanced normally with the aforesaid second potential relative to said reference potential; and means responsive to non-reference potential of at least one of said intermediate circuit junction points due to non-correspondence of switch positions for sequentially positioning one of said switches so as to reestablish refrence potential at each of said intermediate circuit junction points and correspondence of switch positions.

8. A system for maintaining correspondence of positions of an externally positionable master switch and an internally positionable slave switch each having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control networks connected across said input terminals each provided in order from said first to said second input terminal with a first outer, an intermediate and a second outer circuit junction point, the intermediate junction point of each network being normally at said reference potential and the outer junction points of each network being located in balanced relation to one another relative to said point of reference potential; auxiliary switching means for placing with the traverse of said master switch at a first of two possible potentials distinct $2^n+p$ combinations of 0, 1, 2, . . . $n$, $n+1$ of said first outer circuit junction points at a time and the remaining of said first outer circuit junction points at the second possible potential; auxiliary switching means for placing with the traverse of said slave switch at a first of two possible potentials balanced normally with the aforesaid first potential relative to said reference potential the respectively corresponding $2^n+p$ combinations of 0, 1, 2, . . . $n$, $n+1$ of said second outer circuit junction points at a time and the remaining of said second outer circuit junction points at the second possible potential balanced normally with the aforesaid second potential relative to said reference potential; and means responsive to non-reference potential of at least one of said intermediate circuit junction points due to change of master switch position for sequentially positioning said slave switch so as to reestablish reference potential at each of said intermediate circuit junction points and correspondence of switch positions.

9. A system for maintaining correspondence of positions of an externally positionable master switch and a plurality of internally positionable slave switches, each of said switches having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control networks connected across said input terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; auxiliary switching means for placing with the traverse of said master switch at a first of two possible potentials distinct $2^n+p$ combinations of 0, 1, 2, . . . $n$, $n+1$ of said first outer circuit junction points at a time and the remaining of said first outer circuit junction points at the second possible potential; auxiliary switching means for placing with the traverse of one of said slave switches at a first of two possible potentials balanced normally with the aforesaid first potential relative to said reference potential the respectively corresponding $2^n+p$ combinations of 0, 1, 2, . . . $n$, $n+1$ of said second outer circuit junction points at a time and the remaining of said second outer circuit junction points at the second possible potential balanced normally with the aforesaid second potential relative to said reference potential; and a means associated with each of said slave switches responsive to non-reference potential of at least one of said intermediate circuit junction points due to change of master switch position for sequentially positioning its respective slave switch so as to reestablish reference potential at each of said intermediate circuit junction points and correspondence of positions of all of said switches.

10. A system for maintaining correspondence of positions of an externally positionable master switch and a plurality of internally positionable slave switches, each of said switches having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control circuit means connected from said first input terminal respectively to $n+1$ first outer circuit junction points; one group associated with each one of said slave switches, of $n+1$ control networks connected from said second input terminal respectively to said $n+1$ outer circuit junction points, each of said networks provided in order from its respective first outer circuit junction point to said second input terminal with an intermediate and a second outer circuit junction point, the intermediate junction points of each network being normally at said reference potential and the outer junction points of each network being located in balanced relation to one another relative to said point of reference potential; auxiliary switching means for placing with the traverse of said master switch at a first of two possible potentials distinct $2^n+p$ combinations of 0, 1, 2, . . . $n$, $n+1$ of said first outer circuit junction points at a time and the remaining of said first outer circuit junction points at the second possible potential; one auxiliary switching means connected to each one of said slave switches for placing with the traverse of its associated switch at a first of two possible potentials balanced normally with the aforesaid first potential relative to said reference potential the respectively corresponding $2^n+p$ combinations of 0, 1, 2, . . . $n$, $n+1$ of the second outer circuit junction points of its associated group at a time and the remaining second outer circuit junction points of such group at the second possible potential balanced normally with the aforesaid second potential relative to said reference potential; and one means associated with each one of said slave switches and responsive to non-reference potential of at least one intermediate circuit junction point in its associated group due to change of master switch position for sequentially positioning its respective slave switch so as to re-establish reference potential at each of said intermediate circuit junction points of such group and correspondence of the positions of all said switches.

11. A system for maintaining correspondence of positions of a first and a second externally and internally positionable switch each having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control networks connected across said input terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; auxiliary switching means for placing with the traverse of said first switch at a first of two possible potentials distinct $2^n+p$ combinations of 0, 1, 2, . . . $n$, $n+1$ of said first outer circuit junction points at a time and the remaining of said first outer circuit junction points at the second possible potential; auxiliary switching means for placing with the traverse of said second switch at a first of two possible potentials balanced normally with the aforesaid first potential relative to said reference potential the respectively corresponding $2^n+p$ combinations of 0, 1, 2, . . . $n$, $n+1$ of said second outer circuit junction points at a time and the remaining of said second outer circuit junction points at the second possible potential balanced normally with the aforesaid second potential relative to said reference potential; and means responsive to non-reference potential of at least one of said intermediate circuit junction points due to external positioning of one of said switches for sequentially internally positioning the other of said switches so as to reestablish reference potential at each of said intermediate circuit junction points and correspondence of switch positions; and means for precluding internal positioning of said one externally positioned switch for a predetermined length of time.

12. A system for maintaining correspondence of positions of a first and a second externally and internally positionable switch each having $2^n+p$ discrete positions, where $n$ is a positive integer including zero and $p$ is an integer satisfying the relation $1 \leq p \leq 2^n$, comprising in combination means for applying first and second input voltages between a point of reference potential and respectively a first and second input terminal; $n+1$ control networks connected across said input terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; auxiliary switching means for placing with the traverse of said first switch at a first of two possible potentials distinct $2^n+p$ combinations of 0, 1, 2, . . . $n$, $n+1$ of said first outer circuit junction points at a time and the remaining of said first outer circuit junction points at the second possible potential; auxiliary switching means for placing with the traverse of said second switch at a first of two possible potentials balanced normally with the aforesaid first potential relative to said reference potential the respectively corresponding $2^n+p$ combinations of 0, 1, 2, ... n, n+1 of said second outer circuit junction points at a time and the remaining of said second outer circuit junction points at the second possible potential balanced normally with the aforesaid second potential relative to said reference potential; one means associated with each one of said switches and responsive to non-reference potential of at least one of said intermediate junction points due to external positioning of the other of said switches for sequentially internally positioning its associated switch so as to reestablish reference potential of each of said intermediate junction points and correspondence of switch positions; and one means associated with each one of said switches for disabling for a predetermined length of time the operation of its associated sequential positioning means upon external operation of its associated switch.

13. A system for maintaining correspondence of positions of a first and second switch each having $2^n+p$ discrete positions, where $n$ is a positive integer including zero and $p$ is an integer satisfying the relation $1 \leq p \leq 2^n$, comprising in combination means for applying first and second balanced alternating input voltages between a point of reference potential and respectively a first and second input terminal; $n+1$ resistive control networks connected across said intput terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; $n+1$ rectifiers having one set of like electrodes connected respectively to said intermediate circuit junction points and having the other like electrodes connected together to a rectifier load terminal; a rectifier load network connected from said rectifier load terminal to said point of reference potential; auxiliary switching means for placing with the traverse of said first switch at a first of two possible potentials distinct $2^n+p$ combinations of 0, 1, 2, ... n, n+1 of said first outer circuit junction points at a time and for placing the remaining of said first outer circuit junction points at the second possible potential; auxiliary switching means for placing with the traverse of said second switch at a first of two possible potentials balanced normally with respect to the aforesaid first potential the respectively corresponding $2^n+p$ combinations of 0, 1, 2, ... n, n+1 of said second outer circuit junction points at a time and for placing the remaining of said second outer circuit junction points at the second possible potential balanced normally with respect to the aforesaid second potential; and means responsive to the flow of a rectified unbalance current from at least one of said intermediate circuit junction points through said rectifier load network due to non-correspondence of switch positions for sequentially positioning one of said switches so as to restore reference potential at each of said intermediate circuit junction points and correspondence of switch positions.

14. A system for maintaining correspondence of positions of an externally positionable master switch and an internally positionable slave switch each having $2^n+p$ discrete positions, where $n$ is a positive integer including zero and $p$ is an integer satisfying the relation $1 \leq p \leq 2^n$, comprising in combination means for applying first and second balanced alternating input voltages between a point of reference potential and respectively a first and second input terminal; $n+1$ resistive control networks connected across said input terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; $n+1$ rectifiers having one set of like electrodes connected respectively to said intermediate circuit junction points and having the other like electrodes connected together to a rectifier load terminal; a rectifier load network connected from said rectifier load terminal to said point of reference potential; auxiliary switching means for placing with the traverse of said master switch at a first of two possible potentials distinct $2^n+p$ combinations of 0, 1, 2, ... n, n+1 of said first outer circuit junction points at a time and for placing the remaining of said first outer circuit junction points at the second possible potential; auxiliary switching means for placing with the traverse of said slave switch at a first of two possible potentials balanced normally with respect to the aforesaid first potential the respectively corresponding $2^n+p$ combinations of 0, 1, 2, ... n, n+1 of said second outer circuit junction points at a time and for placing the remaining of said second outer circuit junction points at the second possible potential balanced normally with respect to the aforesaid second potential; and means responsive to the flow of a rectified unbalance current from at least one of said intermediate circuit junction points through said rectifier load network due to change in master switch position for sequentially positioning said slave switch so as to restore reference potential at each of said intermediate circuit junction points and correspondence of switch positions.

15. A system for maintaining correspondence of positions of an externally positionable master switch and a plurality of internally positionable slave switches, each of said switches having $2^n+p$ discrete positions, where $n$ is a positive integer including zero and $p$ is an integer satisfying the relation $1 \leq p \leq 2^n$, comprising in combination means for applying first and second balanced alternating input voltages between a point of reference potential and respectively a first and second input terminal; $n+1$ resistive control networks connected across said input terminals each provided in order from said first to said second input terminal with a first outer an intermediate and a second outer circuit junction point, the intermediate junction points of each network being normally at said reference potential and the outer junction points of each network being located in balanced relation to one another relative to said point of reference potential; $n+1$ rectifiers having one set of like electrodes connected respectively to said intermediate circuit junction points and having the other like electrodes connected together to a rectifier load terminal; a rectifier load network connected from said rectifier load terminal to said point of reference potential; auxiliary switching means for placing with the traverse of said master switch at a first of two possible potentials distinct $2^n+p$ combinations of 0, 1, 2, ... n, n+1 of said first outer circuit junction points at a time and for placing the remaining of said first outer circuit junction points at the second possible potential; auxiliary switching means for placing with the traverse of one of said slave switches at a first of two possible potentials balanced normally with respect to the aforesaid first potential the respectively corresponding $2^n+p$ combinations of 0, 1, 2, ... n, n+1 of said second outer junction points at a time and for placing the remaining of said second outer circuit junction points at the second possible potential balanced normally with respect to the aforesaid second potential; and a means associated with each one of said slave switches and responsive to the flow of a rectified unbalance current from at least one of said intermediate circuit junction points through said rectifier load network due to change in master switch position for sequentially positioning its respective slave switch so as to restore reference potential at each of said intermediate circuit junction points and correspondence of the positions of all said switches.

16. A system for maintaining correspondence of positions of an externally positionable master switch and a plurality of internally positionable slave switches, each of said switches having $2^n+p$ discrete positions, where $n$ is a positive integer including zero and $p$ is an integer satisfying the relation $1 \leq p \leq 2^n$, comprising in combination means for applying first and second balanced alternating input voltages between a point of reference potential and respectively a first and second input terminal; $n+1$ resistors connected from said first input terminal respectively to $n+1$ first outer circuit junction points; one group associated with each one of said slave switches, of $n+1$ resistive control networks connected from said second input terminals to respectively said $n+1$ first outer circuit junction points, each of said networks provided in order from its respective first outer circuit junction point to said second input terminal with an intermediate and a second outer circuit junction point, the intermediate junction points of each network being normally at said reference potential and the outer junction points of each network being located in balanced relation to one another relative to said point of reference potentials; $n+1$ rectifiers associated with each of said groups having one set of like electrodes connected respectively to said intermediate circuit junction points of the associated group and having the other like terminals in each group connected together to a rectifier load terminal associated with such group; a rectifier load network for each of said groups connected from the associated rectifier load terminal to said point of reference potential; auxiliary switching means for placing with the traverse of said master switch at a first of two possible potentials distinct $2^n+p$ combinations of 0, 1, 2, ... $n$, $n+1$ of said first outer circuit junction points at a time and for placing the remaining of said first outer circuit junction points at the second possible potential; one auxiliary switching means connected to each one of said slave switches for placing with the traverse of its associated slave switch at a first of two possible potentials balanced normally with respect to the aforesaid first potential the respectively corresponding $2^n+p$ combinations of 0, 1, 2, ... $n$, $n+1$ of the second outer circuit junction points of its associated group at a time and for placing the remaining of the second outer circuit junction points of its associated group at the second possible potential balanced normally with respect to the aforesaid second potential; and one means associated with each one of said slave switches and responsive to the flow of a rectified unbalance current from at least one of the intermediate circuit junction points of its associated group through the associated rectifier load network due to change in master switch position for sequentially positioning its respective slave switch so as to restore reference potential at each of the associated intermediate circuit junction points and correspondence of the positions of all said switches.

17. A system for maintaining correspondence of positioning of a first and a second externally and internally positionable switch each having $2^n+p$ discrete positions, where $n$ is a positive integer including zero and $p$ is an integer satisfying the relation $1 \leq p \leq 2^n$, comprising in combination means for applying first and second balanced alternating input voltages between a point of reference potential and respectively a first and second input terminal; $n+1$ resistive control networks connected across said input terminals each provided in order from said second input terminal with a first outer, an intermediate and a second outer circuit junction point, the intermediate junction points of each network being normally at said reference potential and the outer junction points of each network being located in balanced relation to one another relative to said point of reference potential; $n+1$ rectifiers having one set of like terminals connected respectively to said intermediate circuit junction points and having the other like electrodes connected together to a rectifier load terminal; a rectifier load network connected from said rectifier load terminal to said point of reference potential; auxiliary switching means for placing with the traverse of said first switch at a first of two possible potentials distinct $2^n+p$ combinations of 0, 1, 2, ... $n$, $n+1$ of said first outer circuit junction points at a time and for placing the remaining of said first outer junction points at the second possible potential; auxiliary switching means for placing with the traverse of said second switch at a first of two possible potentials balanced normally with respect to the aforesaid first potential the respectively corresponding $2^n+p$ combinations of 0, 1, 2, ... $n$, $n+1$ of said second outer circuit junction points at a time and for placing the remaining of said second outer circuit junction points at the second possible potential balanced normally with respect to the aforesaid second potential; means responsive to the flow of a rectified unbalance current from at least one of said intermediate circuit junction points through said rectifier load network due to external positioning of one of said switches for sequentially internally positioning the other of said switches so as to restore reference potential at each of said intermediate circuit junction points and correspondence of switch positions; and means for precluding internal positioning of said one externally positioned switch for a predetermined length of time.

18. A system for maintaining correspondence of positions of a first and a second externally and internally positionable switch each having $2^n+p$ discrete positions, where $n$ is a positive integer including zero and $p$ is an integer satisfying the relation $1 \leq p \leq 2^n$, comprising in combination means for applying first and second balanced alternating input voltages between a point of reference potential and respectively a first and second input terminal; $n+1$ resistive control networks connected across said input terminals each provided in order from said first to said second input terminal with a first outer, an intermediate and a second outer circuit junction point, the intermediate junction points of each network being normally at said reference potential and the outer junction points of each network being located in balanced relation to one another relative to said point of reference potential; $n+1$ rectifiers having one set of like terminals connected respectively to said intermediate circuit junction points and having the other like electrodes connected together to a rectifier load terminal; a rectifier load network connected from said rectifier load terminal to said point of reference potential; auxiliary switching means for placing with the traverse of said first switch at a first of two possible potentials distinct $2^n+p$ combinations of 0, 1, 2, ... $n$, $n+1$ of said first outer circuit junction points at a time and for placing the remaining of said first outer junction points at the second possible potential; auxiliary switching means for placing with the traverse of said second switch at a first of two possible potentials balanced normally with respect to the aforesaid first potential the respectively corresponding $2^n+p$ combinations of 0, 1, 2, ... $n$, $n+1$ of said second outer circuit junction points at a time and for placing the remaining of said second outer circuit junction points at the second possible potential balanced normally with respect to the aforesaid second potential; one means associated with each one of said switches and responsive to the flow of a rectified unbalance current from at least one of said intermediate circuit junction points due to external positioning of the other of said switches for sequentially internally positioning its associated switch so as to restore reference potential at each of said intermediate circuit junction points and correspondence of switch positions; and one means associated with each one of said switches for disabling for a predetermined length of time the operation of its associated sequential positioning means upon external operation of its associated switch.

19. The combination as defined in claim 1, wherein a switch is positionable externally bidirectionally and internally unidirectionally.

20. The combination as defined in claim 6 wherein the sequential positioning means of one switch is operable unidirectionally and is connected to its associated one switch, and wherein the disabling means includes means for disconnecting for the predetermined length of time said sequential positioning means from said one switch responsive to external operation of said one switch, thereby to permit external operation of said one switch in either direction.

21. The combination as defined in claim 6 wherein the sequential positioning means of one switch comprises a rotary solenoid having a rotor and being energizable responsive to external operation of the other switch, and wherein the disabling means is effective to open for the predetermined length of time the energizing circuit for said rotary solenoid responsive to external positioning of said one switch.

22. The combination as defined in claim 21 wherein the rotary solenoid is operable internally unidirectionally, wherein its rotor is connected to its associated one switch and wherein the disabling means includes means for disconnecting for the predetermined length of time said rotor from said one switch responsive to external operation of said one switch, thereby to permit external operation of said one switch in either direction.

23. The combination as defined in claim 6 wherein the sequential positioning means of one switch comprises a rotary solenoid energizable responsive to unbalance of potential of the circuit junction points of at least one of the networks due to external positioning of the other switch, and wherein the disabling means is effective to open for the predetermined length of time the energizing circuit for said rotary solenoid responsive to external positioning of said one switch.

24. The combination as defined in claim 12 wherein the sequential positioning means of one switch comprises a rotary solenoid energizable responsive to non-reference potential of at least one of the intermediate junction points due to external positioning of the other switch, and wherein the disabling means is effective to open for the predetermined length of time the energizing circuit for said rotary solenoid responsive to external positioning of said one switch.

25. The combination as defined in claim 18 wherein the sequential positioning means of one switch comprises a rotary solenoid energizable responsive to the flow of a rectified unbalance current through the rectifier load network due to external operation of the other switch, and wherein the disabling means is effective to open for the predetermined length of time the energizing circuit for said rotary solenoid responsive to external positioning of said one switch.

26. The combination as defined in claim 24 wherein the rotary solenoid has a rotor connected to its associated one switch, and wherein the disabling means includes means also responsive to non-reference potential of at least one of the intermediate junction points for disconnecting said rotor from its associated one switch for the predetermined length of time, thereby to permit external operation of said one switch in either direction.

27. The combination as defined in claim 25 wherein the rotary solenoid has a rotor connected to its associated one switch, and wherein the disabling means includes means also responsive to the flow of a rectified unbalance current through the rectifier load network for disconnecting said rotor from its associated one switch for the predetermined length of time, thereby to permit external operation of said one switch in either direction.

References Cited in the file of this patent

UNITED STATES PATENTS

| | | |
|---|---|---|
| 2,405,628 | Yardeny | Aug. 13, 1946 |
| 2,755,425 | Reid | July 17, 1956 |